C. B. THOMAS.
TOOL OR IMPLEMENT FOR REMOVING RIVETS.
APPLICATION FILED MAR. 2, 1912.
1,051,356.
Patented Jan. 21, 1913.
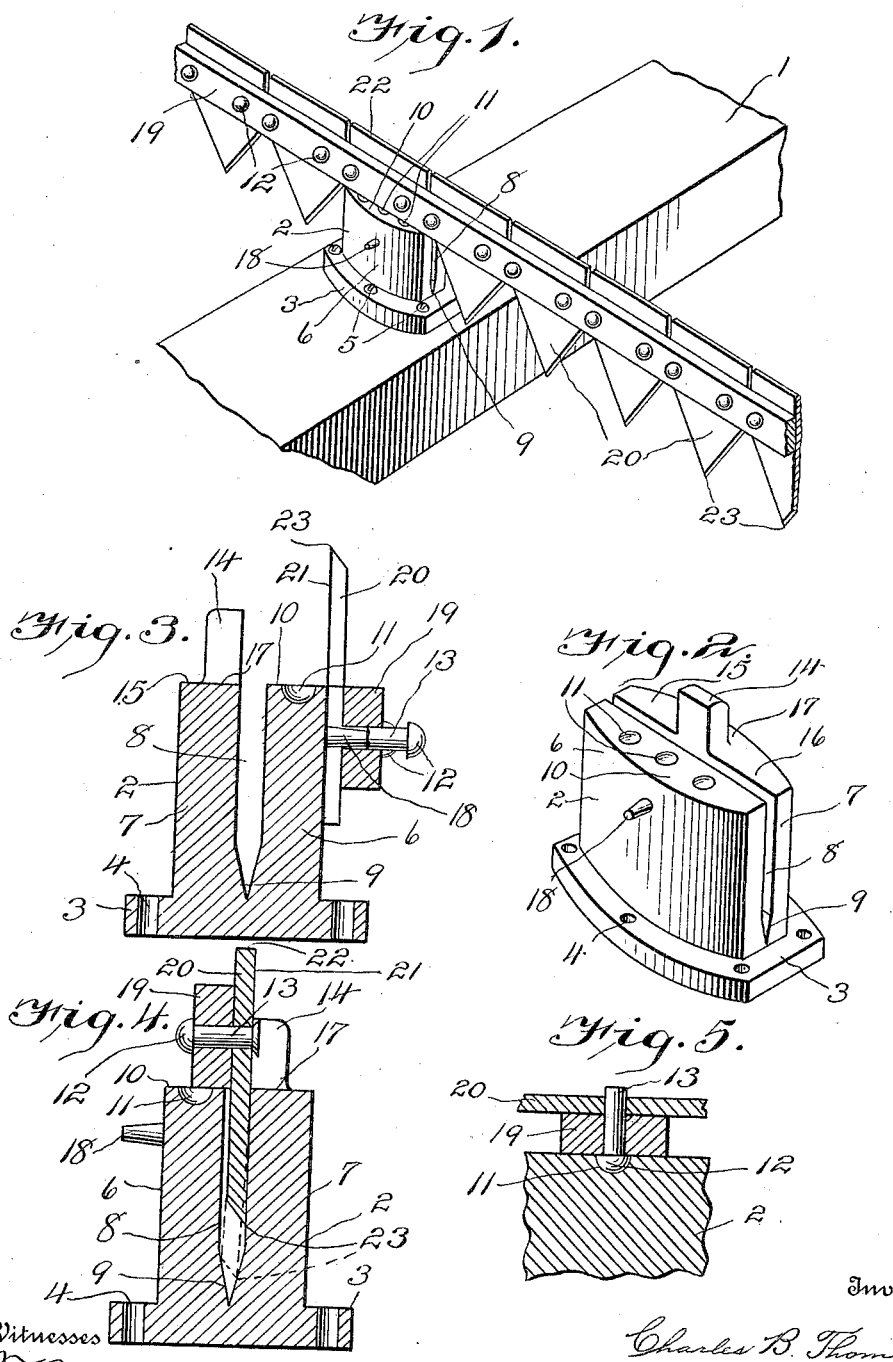

UNITED STATES PATENT OFFICE.

CHARLES B. THOMAS, OF WATTS, SOUTH CAROLINA.

TOOL OR IMPLEMENT FOR REMOVING RIVETS.

1,051,356.   Specification of Letters Patent.   Patented Jan. 21, 1913.

Application filed March 2, 1912. Serial No. 681,316.

*To all whom it may concern:*

Be it known that I, CHARLES B. THOMAS, a citizen of the United States, residing at Watts, in the county of Abbeville and State of South Carolina, have invented certain new and useful Improvements in Tools or Implements for Removing Rivets; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved tool or implement for removing rivets and is particularly adapted to be employed for the purpose of removing cutter knives from the cutter bars of mowing machines and the like.

The usual practice in the construction of cutter bars for mowing machines and the like is to apply the cutter knives to the bars and secure the same thereto by means of rivets. When using a mowing machine the cutter knives frequently become broken or worn out in the field and it is necessary to remove the broken knife or knives and replace the same. The usual practice is to remove the cutter bar from the machine and transport the same to a shop and remove the broken knife or knives and rerivet a new knife or knives in place of the broken ones. This operation as of course is evident is attended with great loss of time and is extremely annoying and inconvenient.

It is for the purpose of obviating these difficulties and rendering it possible to remove a broken cutter knife and substitute a new cutter knife in the field that I have made this present invention.

The invention consists in providing a tool or implement attached to a mowing machine and arranged in a convenient position thereon, preferably on the tongue of the machine, so that upon the breakage of a knife or knives of the cutter bar the cutter bar can be removed from the machine, the broken knives can be removed from the cutter bar and new knives can be reriveted in position on the cutter bar without leaving the machine.

The invention further consists in the novel construction of the tool or implement and in the form and arrangement thereof as will be first fully described and afterward specifically pointed out in the appended claim.

Referring to the accompanying drawings: Figure 1 is a perspective view illustrating the tool or implement in operative position upon the tongue of a mowing machine and illustrating a cutter bar in position within the tool or implement. Fig. 2 is a perspective view of the tool or implement. Fig. 3 is a transverse vertical sectional view illustrating the operation of the rivet removing lug. Fig. 4 is a transverse sectional view illustrating the position of the cutter bar and cutter knife in the tool or implement, and Fig. 5 is a fragmentary sectional view illustrating the position of the cutter bar and knife for receiving a new rivet.

Like numerals of reference indicate the same parts throughout the several figures in which;

1 indicates the tongue of a mowing machine, it being of course understood that the tool or implement may be applied to any part of the machine to suit the fancy of the operator or to suit his convenience.

2 indicates the tool or implement which comprises the flanged base 3 having a plurality of perforations 4 therein to receive suitable fastenings 5 to fasten the tool or implement rigidly in position. Formed on the flanged base 3 and preferably cast integral therewith are the two standards or sections 6 and 7 of the tool or implement, the said two standards or sections being separated by a vertical slot 8 having a tapered bottom 9 for a purpose which will be hereinafter fully described. The face or table 10 of the section or standard 6 is formed flat and is provided with a plurality of small concaved recesses 11 of a size to receive the usual rivet head 12 on the rivet 13, while on the section or standard 7 and centrally thereof is formed a vertical extension 14, said vertical extension 14 being of a width to leave the end portions 15 and 16 of the face 17 of the standard 7 flat for a purpose which will be hereinafter fully described. Extending transversely from the side of the section or standard 7 is the rivet removing lug 18 by means of which the rivets are removed from the cutter bar.

Having thus described the several parts of this invention its operation is as follows: The tool or implement 2 being con- veniently applied in position a knife is removed from the cutter bar in the following manner: The cutter bar is placed in position in the tool or implement as shown in Figs. 1 and 4, the cutter bar 19 resting on the flat face 10 of the section or standard 6, while the cutter knife 20 extends into the vertical slot or opening 8, the face 21 of the knife 20 lying against the vertical extension 14 on the section or standard 7. When the cutter bar or knife is in this position the back 22 of the knife 20 is given a few sharp blows with a hammer at a point above the rivet 13 in order to shear the rivet at a point between the cutter bar 19 and the knife 20. The cutter bar is then held in position and the second rivet is sheared in like manner. As the second rivet is sheared the knife 20 drops into the slot or opening 8 causing the edge or point 23 of the knife 20 to enter the tapered or wedge shaped bottom 9 of the slot or opening 8 in such manner as to protect the point or cutting edge of the knife 20. It will also be seen that as the knife 20 is receiving the hammer blows on the back 22 that the vertical extension 14 on the section or standard 6 supports the said knife 20 preventing all tendency of the cutter bar and knife to move laterally by reason of force of the hammer blows. When the knife has been removed by shearing the rivets as before described the cutter bar 19 is applied to the rivet removing lug 18 as shown in Fig. 3 and a light tap of a hammer on the cutter bar 19 causes the rivet removing lug 18 to force the rivet out of the cutter bar in the manner as shown in Fig. 3, thus rendering the cutter bar capable of receiving a new rivet for a new knife. In order to apply a new knife in position in place of the one removed the rivets are placed in proper position and the head of each rivet is placed in one of the concaved recesses 11 in the face 10 of the standard or section 7 as shown in Fig. 5 and the knife is applied in proper position, the rivet 13 extending through the knife as shown. When in this position the end of the rivet is struck with a hammer or peened in order to upset the end of the rivet to securely fasten the knife in position on the cutter bar as will be apparent from an inspection of Fig. 5.

Having thus fully described the invention it is of course apparent that certain changes can be made in the form and arrangement of the parts, and I consider myself clearly entitled to all such changes and modifications as fall within the limit and scope of the appended claim.

What I claim and desire to secure by Letters Patent of the United States is:—

An implement of the character described comprising a base, a pair of vertical sections or standards arranged thereon, said sections or standards having a vertical slot or space between the same to receive a cutter knife, the bottom portion of said slot or space being tapered for the purpose described, a central vertical extension on one of said standards, said vertical extension rising above the face or table of the other standard.

In testimony whereof, I affix my signature, in presence of two witnesses.

CHARLES B. THOMAS.

Witnesses:
C. HUGH DUFFY,
CHAS. M. BIRCKHEAD.

---

Copies of this patent may be obtained for five cents each, by addressing the "Commissioner of Patents. Washington, D. C."